United States Patent
Nakanishi (10) Patent No.: US 6,456,893 B1
(45) Date of Patent: Sep. 24, 2002

(54) APPARATUS MANAGEMENT SYSTEM

(75) Inventor: Yoshikazu Nakanishi, Takamatsu (JP)

(73) Assignees: Shikoku Electric Power Company, Inc., Kagawa-ken (JP); Shikoku Research Institute, Inc., Kagawa-ken (JP)

(*) Notice: Subject to any disclaimer, the term of this patent is extended or adjusted under 35 U.S.C. 154(b) by 0 days.

(21) Appl. No.: 09/417,003

(22) Filed: Oct. 12, 1999

Related U.S. Application Data (63) Continuation-in-part of application No. 08/974,109, filed on Nov. 19, 1997, now Pat. No. 5,988,852.

(30) Foreign Application Priority Data

Nov. 26, 1996 (JP) ............................................... 8-314334

(51) Int. Cl.$^7$ ............................................... G06F 19/00
(52) U.S. Cl. ............................. 700/96; 700/97; 716/21
(58) Field of Search ............................. 700/94, 95, 96, 700/97; 716/21

(56) References Cited

U.S. PATENT DOCUMENTS

| | | | |
|---|---|---|---|
| 5,270,917 A | 12/1993 | Kimura | 700/82 |
| 5,355,062 A | 10/1994 | Takizawa et al. | 318/568.1 |
| 5,490,134 A | 2/1996 | Fernandes et al. | 370/466 |
| 5,774,357 A * | 6/1998 | Hoffberg et al. | 713/600 |
| 6,263,255 B1 * | 7/2001 | Tan et al. | 700/121 |

FOREIGN PATENT DOCUMENTS

JP 7-44477 2/1995

OTHER PUBLICATIONS

Hidling Elmqvist; "A Uniform Architecture for Distributed Automation"; *Advances in Instrumentation and Control 46*; Part 2; pp. 1599–1608; 1991.

Pat Toole Jr.; "Distributed SCADA: From the plant floor to the executive suite"; *Instrumentation and Control Systems 69*; No. 1; pp. 67–70; Jan. 1996.

H. Drews et al.; "Leittechnisches Konzept Fur Zementwerke"; *Elektrie 47*; No. 2; pp. 47–51; 1993 Berlin.

European Search Report from application No. EP 97 12 0742; Sep. 30, 1999.

* cited by examiner

*Primary Examiner*—Maria N. Von Buhr
*Assistant Examiner*—Chad Rapp
(74) *Attorney, Agent, or Firm*—Fish & Richardson P.C.

(57) ABSTRACT

A machine management system improves flexibility in control of an apparatus and installation of an additional apparatus. A plurality of refrigerators sends operational information to a virtual machine constructor. The virtual machine constructor constructs virtual machines corresponding to the refrigerators using the received information, and holds the virtual machines therein. Each time the virtual machine constructor receives new information from the refrigerators, it updates the virtual machines. Controllers receive and hold virtual machines from the virtual machine constructor. The controllers cause one of the virtual machines to be selected and displayed in response to a user's request.

30 Claims, 10 Drawing Sheets

APPARATUS MANAGEMENT SYSTEM

CROSS REFERENCE TO RELATED APPLICATION

This application claims priority from U.S. application Ser. No. 08/974,109, titled, "AN APPARATUS MANAGEMENT SYSTEM HAVING VIRTUAL MACHINES CORRESPONDING TO APPARATUSES TO BE CONTROLLED", filed Nov. 19, 1997, which claims priority from Japanese Application No. 314334/1996 filed Nov. 26, 1996.

BACKGROUND OF THE INVENTION

The present invention relates to an apparatus management system for providing apparatus management functions, such as control and monitoring.

There are various kinds of apparatuses that are subjected to management, such as control, monitoring, etc. For example, a variety of electric apparatuses that are installed in a house and/or a business office may be subjected to management. These apparatuses should be operated at preset operating conditions. For example, an air conditioner installed in each room of a house adjusts the temperature of ambient air at a temperature preset by a user.

Such an apparatus to be controlled generally requires settings for operation. It is therefore necessary for a user to manipulate such an apparatus directly, or by using a remote control device. control device.

In a business office or factory, machine control functions, such as start and stop functions, are controlled on a centralized control board. However, for monitoring operating conditions of respective apparatuses in detail using such a control board, it is necessary to preset control conditions and use a control board manufactured on the basis of the preset conditions. In addition, whenever an additional apparatus to be controlled is installed, modifications of the control board may be required. Thus, the use of such a control board creates difficulties in changing preset control conditions for the apparatuses and in installing an additional apparatus, which reduces flexibility in installing and controlling additional apparatuses.

SUMMARY OF THE INVENTION

It is therefore an object of the present invention to provide an apparatus management system which is capable of eliminating disadvantages of the prior art, such as mentioned above, and improving the flexibility to install and control additional apparatuses.

To achieve the object above, the present invention provides an apparatus management system for managing an apparatus having information indicative of the operation conditions thereof.

The system includes a constructor connected to the apparatus for constructing and holding a virtual machine corresponding to the apparatus in response to the information received from the apparatus. The constructor is capable of updating and outputting the virtual machine held therein in response to new information received from the apparatus.

A controller is connected to the constructor and has a storing unit for holding the virtual machine received from the constructor and an input unit for receiving information for controlling the apparatus. The controller is capable of updating the virtual machine held in the storing unit when information is inputted to the input unit, and sending updated virtual machine to the constructor. The constructor is enabled to control the apparatus when updated virtual machine is received from said controller.

The constructor, controller and apparatus may be connected to a communication network.

The controller may further include a display unit for displaying a virtual machine in response to information inputted from the input unit, thereby enabling a user to input information for controlling the apparatus.

The present invention further provides an apparatus management system for managing an apparatus having information indicative of operation conditions thereof, in which a constructor is provided to each apparatus for constructing and holding a virtual machine corresponding to the apparatus in response to the information received from the apparatus. The constructor is capable of updating and outputting the virtual machine held therein in response to new information received from the apparatus.

A controller is connected to the constructor and has a storing unit for holding the virtual machine received from the constructor and an input unit for receiving information for controlling the apparatus. The controller is capable of updating the virtual machine held in the storing unit when information is inputted to the input unit, and sending an updated virtual machine to the constructor. The constructor is enabled to control the apparatus when an updated virtual machine is received from said controller.

The constructor, controller and apparatus may be connected to a communication network.

The controller may further include a display unit for displaying a virtual machine in response to information inputted from the input unit, thereby enabling a user to input information for controlling the apparatus.

The present invention further provides an apparatus management system for managing an apparatus having information indicative of operation conditions thereof, in which a constructor is connected to the apparatus for constructing and holding a virtual machine corresponding to the apparatus in response to the information received from the apparatus. The constructor is capable of updating and outputting the virtual machine held therein in response to new information received from the apparatus.

A first controller is connected to the constructor and has a storing unit for holding the virtual machine received from the constructor. The first controller is capable of updating the virtual machine held in the storing unit in response to new information received from the apparatus.

A second controller is connected to the first controller for storing and outputting control information for controlling the apparatus connected to the first controller.

The first controller is further capable of sending an updated virtual machine to the constructor in response to control information received from the second controller. The constructor is enabled to control the apparatus in response to the updated virtual machine received from the first controller, thereby enabling automatic control of the apparatus.

The constructor, first controller and the apparatus may be connected to a communication network. The second controller also may be connected to a communication network.

According to the present invention, since a virtual machine held in a controller or a computer has the same information as a real apparatus at any time, it is possible to control a remotely located real apparatus by controlling a virtual machine obtainable by a user. It is advantageous that a virtual machine according to the present invention can be utilized as a software tool, thereby enabling those who lack knowledge of data communication, measurement and control to develop a high-grade measurement and control system. According to the present invention, a virtual machine can advantageously absorb any complexity and change in a real apparatus, thereby enabling a united management of apparatuses. According to the present invention, it is easy to design or change a management system, because a constructor can construct and hold new virtual machines each time real apparatuses are added to or removed from a management system, thereby eliminating the necessity of changing the controller.

The various features and advantages of the present invention may be readily understood with reference to the following detailed description taken in conjunction with the accompanying drawings, wherein like reference numerals designate like structural elements.

DESCRIPTION OF THE PREFERRED EMBODIMENTS

The present invention will be described hereinafter in connection with various embodiments thereof with reference to the accompanying drawings. It should be noted that, in the drawings the same or similar structural elements are designated by the same reference numerals.

First Embodiment

Figure 1:
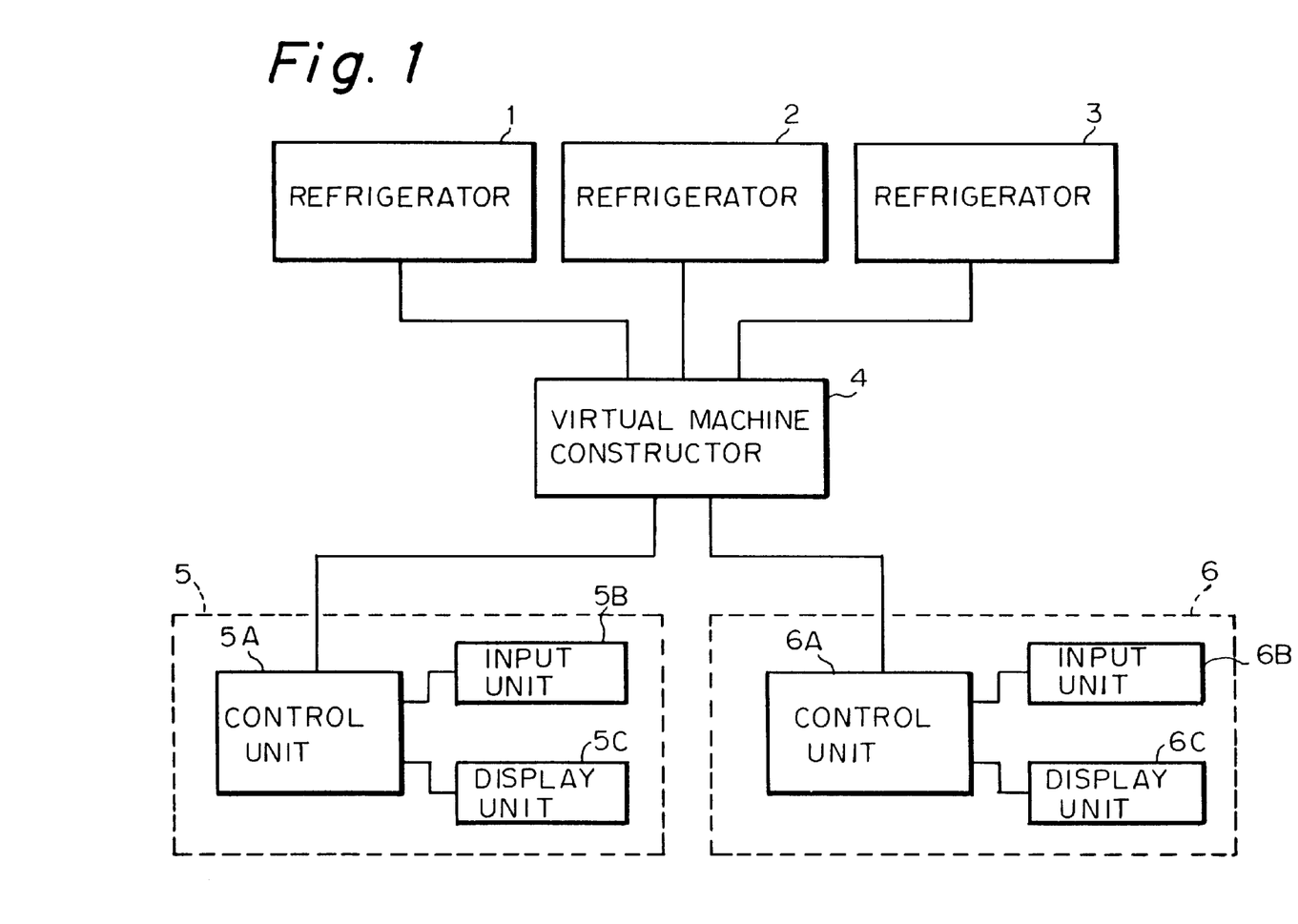
FIG. 1 is a block diagram illustrating a first embodiment of the present invention.

FIG. 1 is a block diagram illustrating the first embodiment of an apparatus management system according to the present invention. An apparatus management system illustrated in FIG. 1 comprises refrigerators 1, 2, 3 as machines to be controlled or target machines, a virtual machine constructor 4, and controllers 5, 6.

The refrigerator 1 may be installed, for example, in a room of a house. The refrigerator 1 has machine information on the initial conditions, status information and control information as its own information. The machine information is information about the refrigerator 1 as an apparatus, and may include an identification number (ID) unique to the refrigerator 1, a manufacturer's name, a model number, rated power consumption, etc. The status information is information indicative of operating conditions of the refrigerator 1, and may include information about current operating mode, current power consumption, temperature and humidity in the refrigerator, etc. The control information is information for controlling the refrigerator 1, and may include information about operation instructions, preset temperature, preset humidity and so on.

When energized by a power supply, the refrigerator 1 sends the machine information, the status information and the control information to the virtual machine constructor 4. Subsequently, the refrigerator 1 periodically sends this information to the virtual machine constructor 4.

The refrigerator 1 starts operation based on the control information of the initial conditions and continues operation in the same condition without receiving any new control information. When receiving new control information from the virtual machine constructor 4, the refrigerator 1 operates based on this new control information.

The refrigerators 2, 3 are identical to the refrigerator 1 except that they are installed in rooms different from that of the refrigerator 1 and that they have IDs different from that of the refrigerator 1. Therefore, explanation of the refrigerators 2, 3 is omitted here.

The virtual machine constructor 4 may be implemented by a computer and comprises a CPU (Central Processing Unit) for controlling the virtual machine constructor 4 itself, a ROM (Read Only Memory) for storing control procedures of the CPU, and a RAM (Random Access Memory) for temporarily holding information. The virtual machine constructor 4, when receiving machine information, status information and control information from, for example, the refrigerator 1, constructs a virtual machine corresponding to the refrigerator 1 using the received information.

The virtual machine corresponding to the refrigerator 1 is constructed at the time the refrigerator 1 starts operating. Subsequently, the virtual machine reflects the information relating to the refrigerator 1 in cooperation with the refrigerator 1. In other words, the virtual machine does not have actual devices, such as a cooling unit and motor, like the refrigerator 1, rather it is an informational entity which has the same functions as the refrigerator 1 and which is virtually constructed on a computer (such as the virtual machine constructor 4) in this embodiment.

Figure 2:
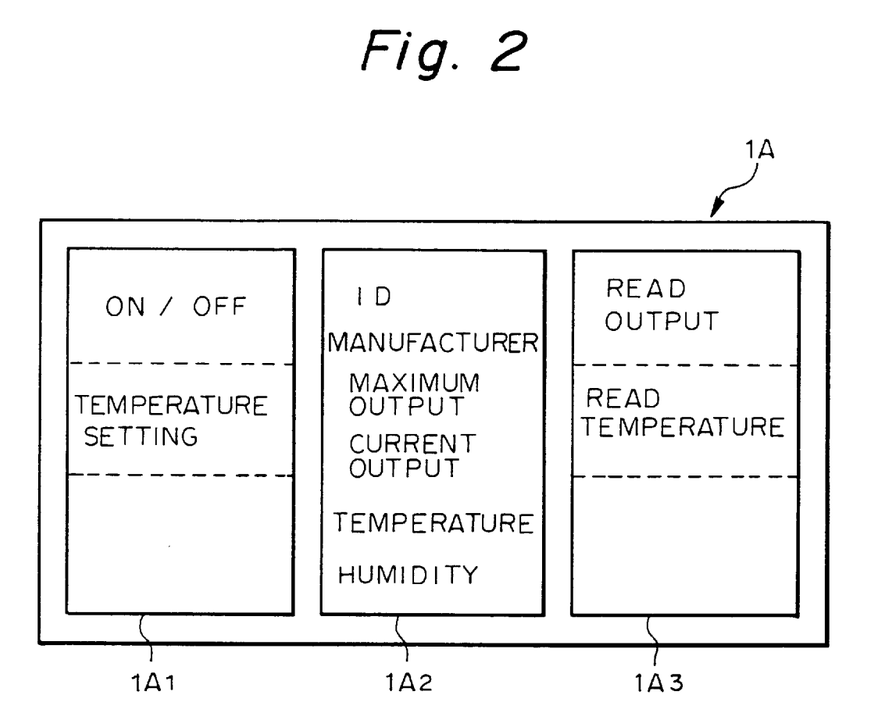
FIG. 2 is a block diagram illustrating an example of a virtual machine.

A virtual machine 1A for the refrigerator 1 constructed by the virtual machine constructor 4 has a configuration as illustrated in FIG. 2. Specifically, the virtual machine 1A comprises a connector 1A, for receiving information, an information unit $1A_2$ comprising control information and machine information, and a connector $1A_3$ for outputting information. Among these components, the information unit $1A_2$ constitutes the main body of the virtual machine. The virtual machine constructor 4 holds in the RAM the virtual machine 1A created in association with the refrigerator 1.

Figure 3:
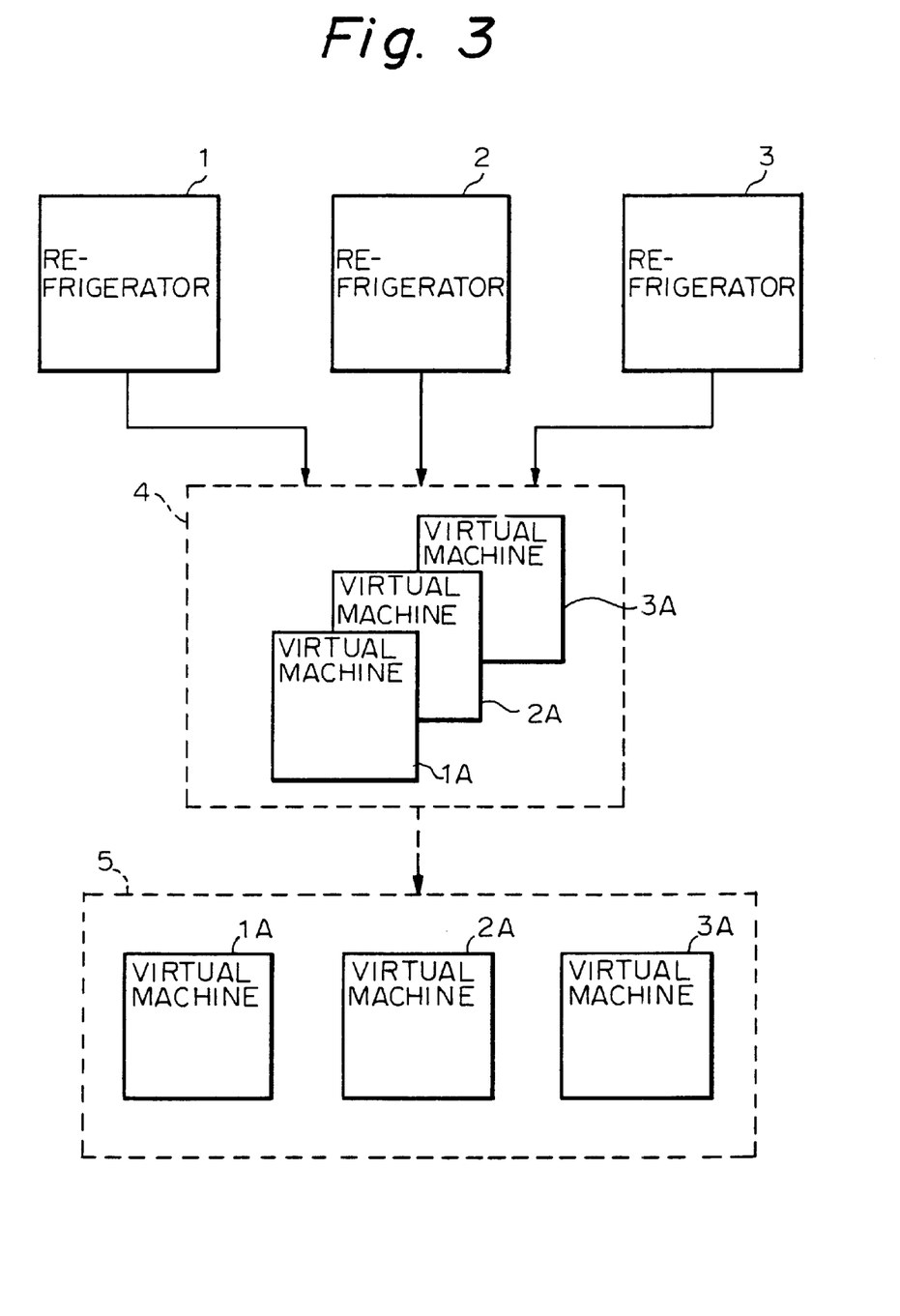
FIG. 3 is a block diagram illustrating how a virtual machine is constructed.

Thus, the virtual machine constructor 4 constructs and holds the virtual machine 1A for the refrigerator 1, as shown in FIG. 3. Similarly, the virtual machine constructor 4 constructs and holds virtual machines 2A, 3A, for the refrigerators 2, 3, respectively. Further, the virtual machine constructor 4 updates the virtual machines 1A, 2A, 3A held therein, each time it receives machine information, status information and control information from the respective refrigerators 1, 2, 3. In other words, the virtual machine constructor 4 always holds the latest virtual machines 1A, 2A, 3A. In updating the virtual machines, the virtual machine constructor 4 identifies a virtual machine corresponding to received machine information, status information and control information, based on the ID included in the machine information.

The virtual machine constructor 4 periodically retrieves the virtual machines 1A, 2A, 3A held therein and sends them to the controllers 5, 6, respectively.

The controller 5 may be a computer and comprises a control unit 5A including a CPU for controlling the controller 5 itself, a ROM for storing control procedures of the CPU, and a RAM for temporarily storing information; an input unit 5B for receiving and inputting a variety of instructions to the control unit 5A; and a display unit 5C for displaying information.

The controller 5, when receiving the virtual machines 1A, 2A, 3A from the virtual machine constructor 4, holds these virtual machines 1A, 2A, 3A in the RAM. Then, the controller 5 selects a virtual machine and displays it on the display unit 5C in response to an instruction from the input unit 5B.

The controller 5, when receiving new virtual machines 1A, 2A, 3A from the virtual machine constructor 4, updates the virtual machines 1A, 2A, 3A held in the controller, while the controller 5 identifies the virtual machines using the IDs thereof.

When control information is inputted through manipulations of the input unit 5B to control any one of the refrigerators 1–3, for example refrigerator 1, the controller 5 reflects such control information on the information unit $1A_2$ of the virtual machine 1A corresponding to the refrigerator 1 to be controlled, thereby updating the virtual machine A held in the virtual machine constructor 4. In other words, the manipulations of the input unit 5B causes the information unit $1A_2$ of the virtual machine 1A to be controlled.

The controller 5 periodically retrieves the virtual machines 1A, 2A, 3A held therein and sends them to the virtual machine constructor 4, thereby enabling the virtual machines held in the virtual machine constructor 4 to be updated. Thus, any control of a virtual machine, such as on/off control and temperature setting can be performed through manipulations of the input unit 5B.

The controller 6 is identical in configuration and operation to the controller 5, and explanation thereof is omitted here.

Next, the operation of the first embodiment of an apparatus management system according to the present invention will be described.

When a user starts up the refrigerator 1 by connecting it to a power supply, the refrigerator 1 sends its machine information, status information and control information to the virtual machine constructor 4, and, thereafter, the refrigerator 1 periodically sends its machine information, status information and control information to the virtual machine constructor 4. Similarly, the refrigerators 2, 3 send their machine information, status information and control information to the virtual machine constructor 4 at the startup and, thereafter, periodically.

The virtual machine constructor 4, when receiving the machine information, the status information and the control information from the respective refrigerators 1, 2, 3, constructs and holds the virtual machines 1A, 2A, 3A for the refrigerators 1, 2, 3, respectively. The virtual machines 1A, 2A, 3A held in the virtual machine constructor 4 are updated by the virtual machine constructor 4 when new machine information, new status information and new control information are received from the refrigerators 1, 2, 3, respectively. Further, the virtual machines 1A, 2A, 3A, held in the virtual machine constructor 4 are periodically sent to the controllers 5, 6 for storage therein.

The controller 5, when receiving any of the virtual machines 1A, 2A, 3A from the virtual machine constructor 4, holds the received virtual machine therein. Further, the controller 5 selects one of the virtual machines held therein and displays the selected virtual machine on the display unit 5C in response to an instruction from the input unit 5B. Also, the controller 5 updates the virtual machine held therein and displays a new virtual machine on the display unit 5C each time it receives any of the virtual machines 1A, 2A, 3A from the virtual machine constructor 4.

If a user wants to control the refrigerator 1, the user inputs control information for controlling the refrigerator 1 while watching the display unit 5C and manipulates the input unit 5B. Then, the controller 4 reflects the control information inputted to the information unit $1A_2$ of the virtual machine 1A.

The controller 5 periodically updates the virtual machine 1A for the refrigerator 1 held in the virtual machine constructor 4. Also, since the information unit $1A_2$ of the virtual machine 1A held in the virtual machine constructor 4 is periodically sent to the refrigerator 1, the control information on the refrigerator 1 is updated. The refrigerator 1, upon receiving new control information, starts a new operation based on the new control information.

In this way, the virtual machine 1A displayed on the display unit 5C of the controller 5 enables the user to learn the current status of the refrigerator 1. In addition, by simply manipulating the virtual machine 1A held in the controller 5, the refrigerator 1 can be controlled in accordance with the virtual machine settings.

If an additional refrigerator is installed, an additional RAM may be provided in the virtual machine constructor 4 for holding a virtual machine corresponding to the additional refrigerator. It is clear that the first embodiment ensures easy installation of additional refrigerators.

It should be understood that the virtual machines 2A, 3A for the refrigerators 2, 3 are treated by the virtual machine constructor 4 and the controller 5 in the same manner as the virtual machine 1A.

Second Embodiment

Figure 4:
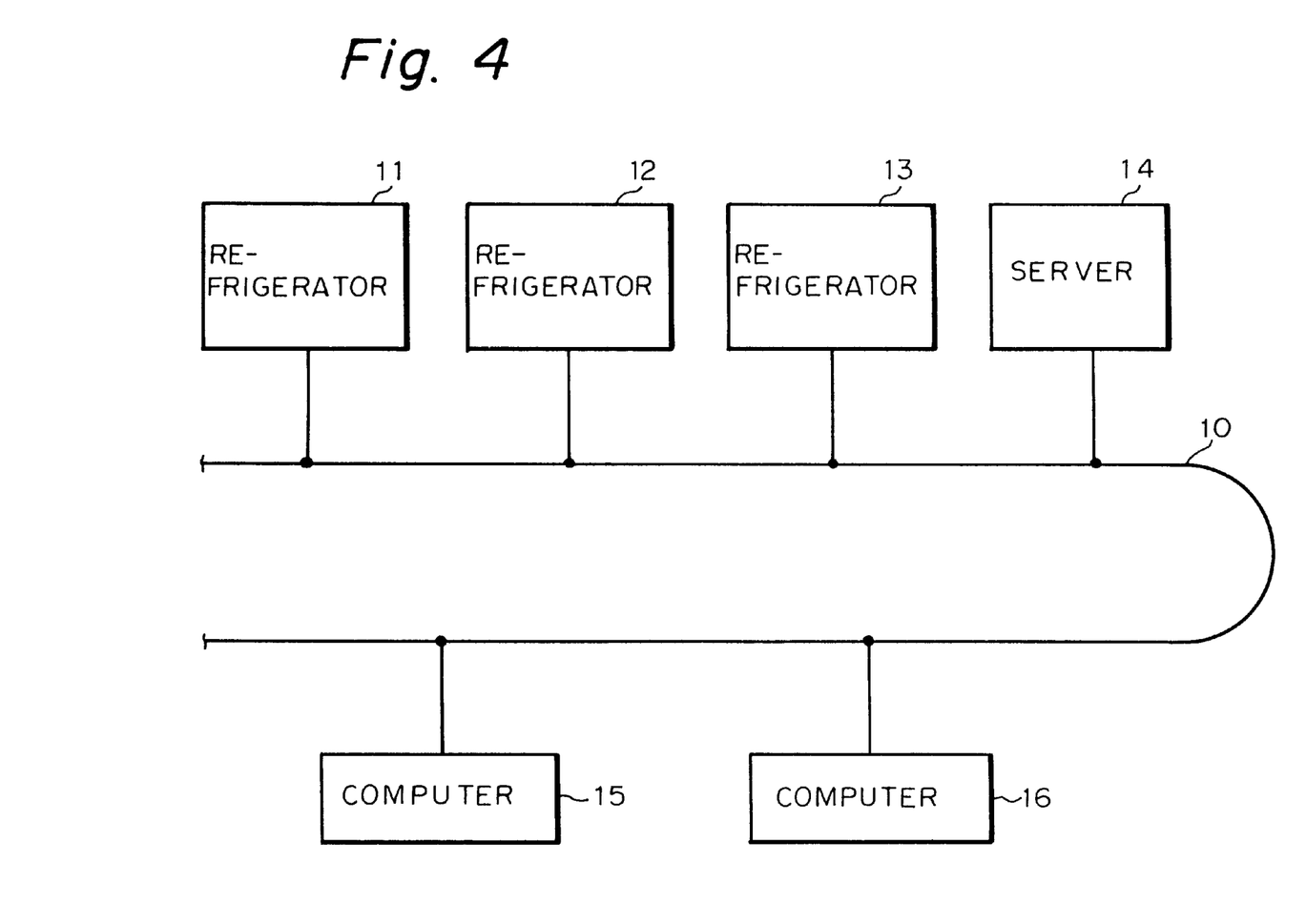
FIG. 4 is a block diagram illustrating a second embodiment of the present invention.

A second embodiment utilizes the above described first embodiment on a network, as shown in FIG. 4. Specifically, in the second embodiment, refrigerators 11, 12, 13 are connected to a server 14 through a network 10. The network 10 may be an electronic information communication network such as LAN (local area network) and Internet.

The server 14 corresponds to the virtual machine constructor 4 in the first embodiment. Computers 15, 16 are further connected to the network 10. The computers 15, 16 correspond to the controllers 15, 6 in the first embodiment.

In the second embodiment, the refrigerators 11, 12, 13 transmit machine information, status information and control information to the server 14 through the network 10, and receive control information from the server 14 through the network 10. In addition, the server 14 transmits and receives virtual machines for the refrigerators 11, 12, 13 to and from the computers 15, 16 through the network 10. Consequently, a user can utilize any one of the computers 15, 16 to manipulate the virtual machines for the refrigerators 11, 12, 13, thereby causing the refrigerators 11, 12, 13 to operate in accordance with the virtual machines. Thus, it is possible to operate the refrigerators 11, 12, 13 from an arbitrary location on the network 10.

Third Embodiment

Figure 5:
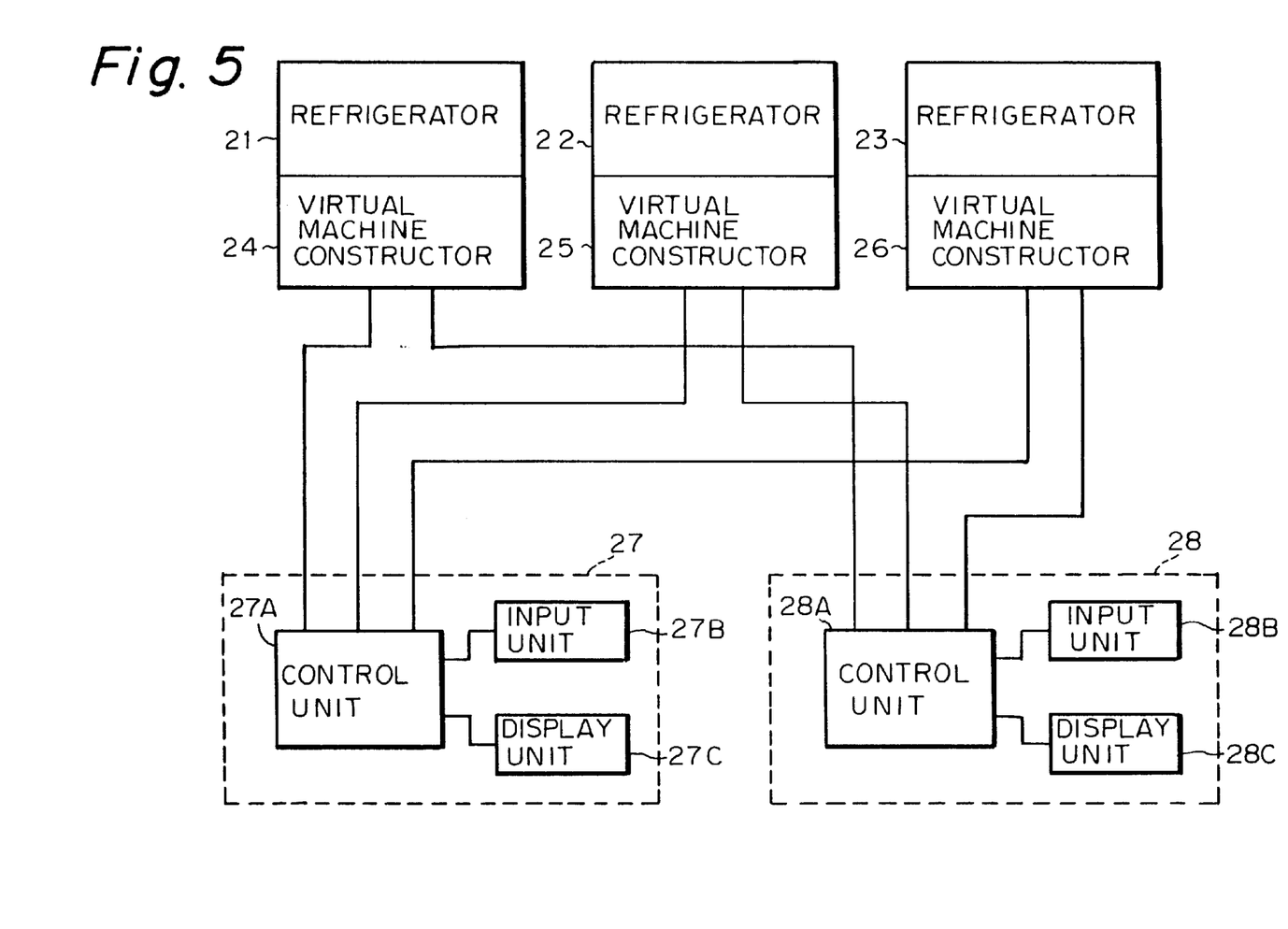
FIG. 5 is a block diagram illustrating a third embodiment of the present invention.

In a third embodiment, as shown in FIG. 5, a virtual machine constructor described in connection with the first embodiment is provided for each of the refrigerators. Specifically, in the third embodiment, virtual machine constructors 24, 25, 26 are provided respectively for refrigerators 21, 22, 23. Control units 27A, 28B of controllers 27, 28 transmit and receive virtual machines to and from the virtual machine constructors 24, 25, 26.

In the third embodiment, since each refrigerator is provided with a virtual machine constructor, the virtual machine constructors 24, 25, 26 need not be modified when an additional refrigerator is installed in the system.

Fourth Embodiment

Figure 6:
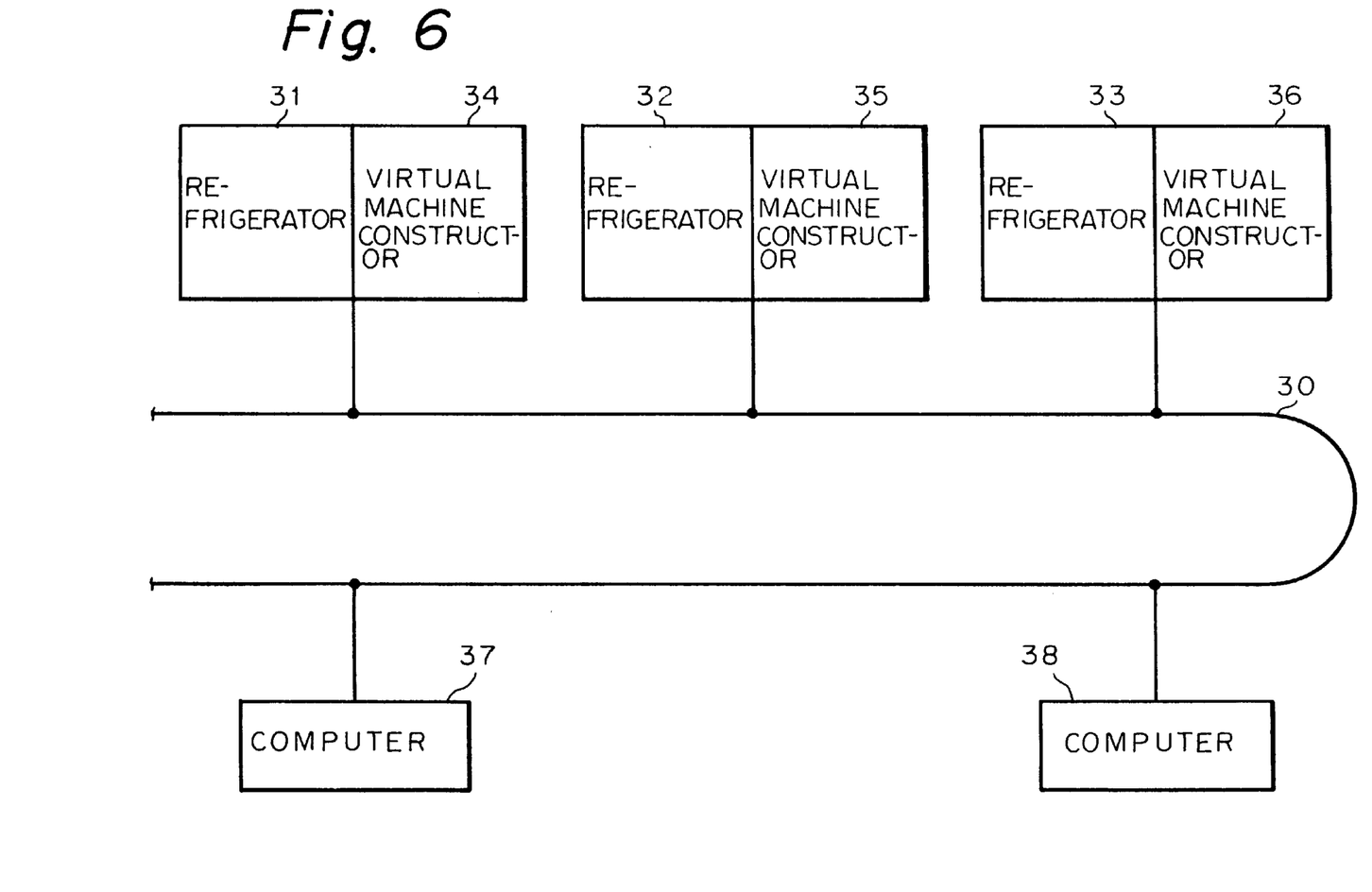
FIG. 6 is a block diagram illustrating a fourth embodiment of the present invention.

In a fourth embodiment, the third embodiment is implemented on a network, as shown in FIG. 6. Specifically, in the fourth embodiment, virtual machine constructors 34, 35, 36 associated with refrigerators 31, 32, 33 are connected to a network 30. The network 30 may be an electronic information communication network such as LAN (local are a network) or Internet, as is the case of the network 10 in the second embodiment.

In the fourth embodiment, the virtual machine constructors 34, 35, 36 associated with the refrigerators 31, 32, 33 transmit and receive virtual machines to and from computers 37, 38 through the network 30. This configuration enables a user to utilize any of the computers 37, 38 to manipulate the virtual machines for the refrigerators 31, 32, 33, thereby allowing the refrigerators 31, 32, 33 to operate in accordance with the virtual machines. Thus, it is possible to operate the refrigerators from an arbitrary location on the network 30.

In the fourth embodiment, in the case where an additional refrigerator is installed, a virtual machine constructor for the additional refrigerator can be connected to the network 30. Consequently, the virtual machine corresponding to the additional refrigerator is transmitted and received to and from the computers 37, 38. This configuration ensures the easy installation of additional refrigerators.

Fifth Embodiment

Figure 7:
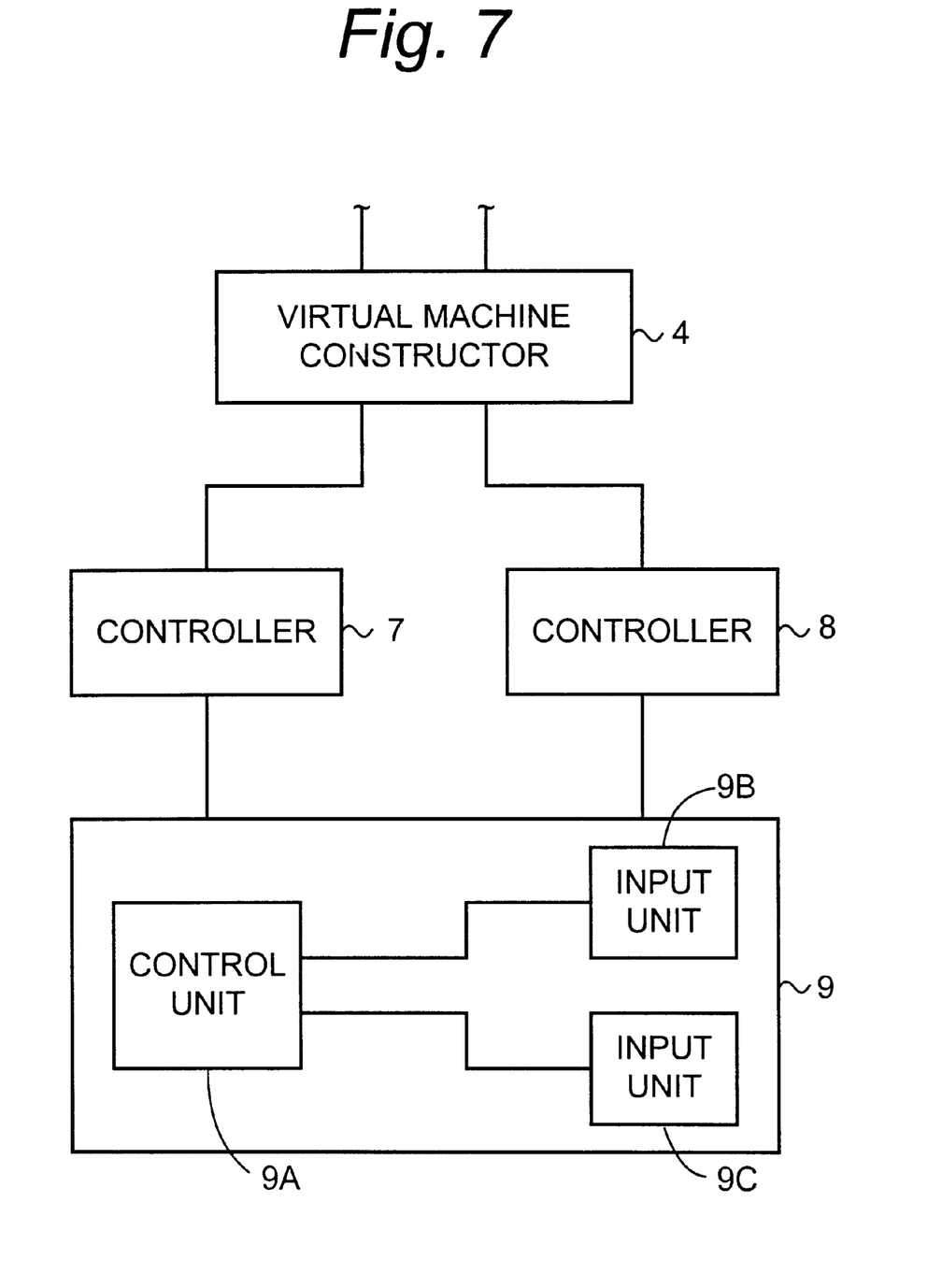
FIG. 7 is a block diagram illustrating a fifth embodiment of the present invention.

A fifth embodiment utilizes controllers 7, 8, 9, as illustrated in FIG. 7, in place of the controllers 5, 6 in the first embodiment.

The controller 7 may be a computer and may include a CPU, a ROM for storing control procedures of the CPU, and a RAM for temporarily holding information.

The controller 7, upon receiving virtual machines 1A, 2A, 3A from a virtual machine constructor 4, holds these virtual machines 1A, 2A, 3A in the RAM. The controller 7, upon receiving new virtual machines 1A, 2A, 3A from the virtual machine constructor 4, updates the virtual machines 1A, 2A, 3A held the controller 7, while identifying the virtual machines using IDs.

When the controller 7 receives, for example, control information on the virtual machine 1A from the controller 9, a connector 1A, of the virtual machine 1A held in the controller 7 receives the control information. The controller 7 reflects this control information on an information unit 1A$_2$ of the virtual machine to update the virtual machine. In other words, control information from the controller 9 can manipulate the information unit 1A$_2$ of the virtual machine 1A held in the controller 7. Subsequently, the controller 7 sends status information on the information unit 1A$_2$ back to the controller 9.

The controller 7 periodically retrieves the virtual machines 1A, 2A, 3A held therein and sends them to the virtual machine constructor 4. Since updated virtual machines are sent to the virtual machine constructor 4, any control function of a virtual machine, such as ON/OFF control and temperature setting can be performed on the basis of control information sent from the controller 9.

Since the controller 8 is identical in configuration and operation to the controller 7, explanation thereof is omitted here.

The controller 9 may be a computer for performing, for example, sequence control, and includes a CPU, a ROM for storing control procedures of the CPU, and a RAM for temporarily storing information. The controller 9 holds control information for the refrigerators 1, 2, 3. In operation, the controller 9 reads out the stored control information, for example, of the refrigerators 1, 2, 3, and sends the information to the controllers 7, 8. Also, the controller 9 is informed of the status of the refrigerators 1, 2, 3 by status information from the controllers 7, 8.

It is understood from the foregoing that automatic control for the refrigerators 1, 2, 3 can be achieved by the controller 9 in the fifth embodiment.

Sixth Embodiment

Figure 8:
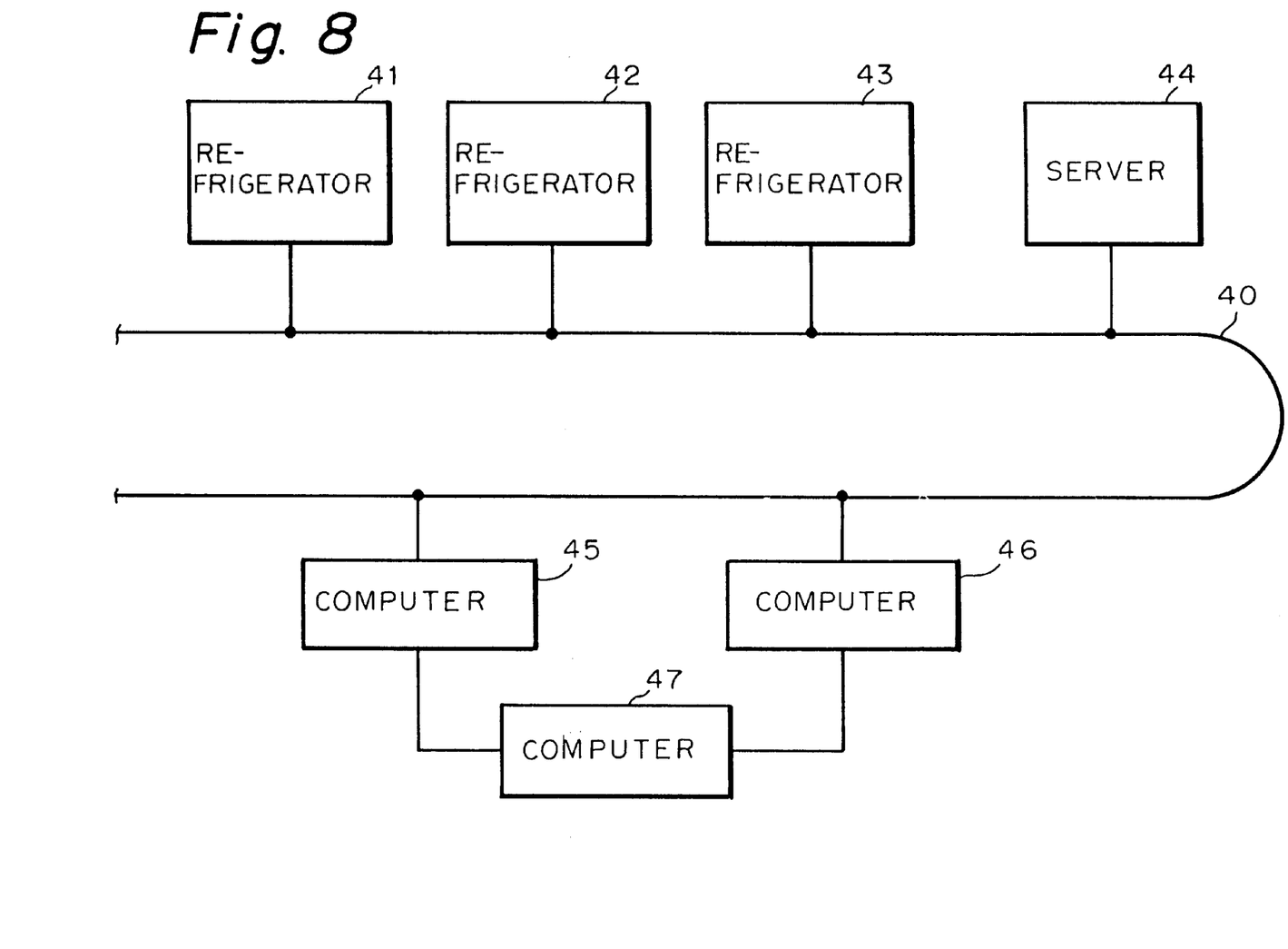
FIG. 8 is a block diagram illustrating a sixth embodiment of the present invention.

A sixth embodiment utilizes the above described fifth embodiment on a network, as shown in FIG. 8. Specifically, in the sixth embodiment, refrigerators 41, 42, 43 are connected to a server .14 through a network 40. The network 40 may be an electronic information communication network such as LAN and Internet.

The server 44 corresponds to the virtual machine constructor 4 in the fifth embodiment. In addition, computers 45, 46, connected to the network 10, correspond to the controllers 7, 8 in the fifth embodiment, and a computer 47 connected to the computers 45, 46 corresponds to the controller 9 in the fifth embodiment.

In the sixth embodiment, the refrigerators 41, 42, 43 transmit machine information, status information and control information to the server 44 through the network 40. The refrigerators 41, 42, 43 receive control information from the server 44 through the network 40. The server 44 transmits and receives virtual machines for the refrigerators 41, 42, 43 to and from the computers 45, 46 through the network 40. In addition, the computers 45, 46 receive control information from the computer 47. Consequently, it is possible to automatically operate the refrigerators 41, 42, 43 in accordance with the control procedures inputted by a user to the computer 47.

Seventh Embodiment

Figure 9:
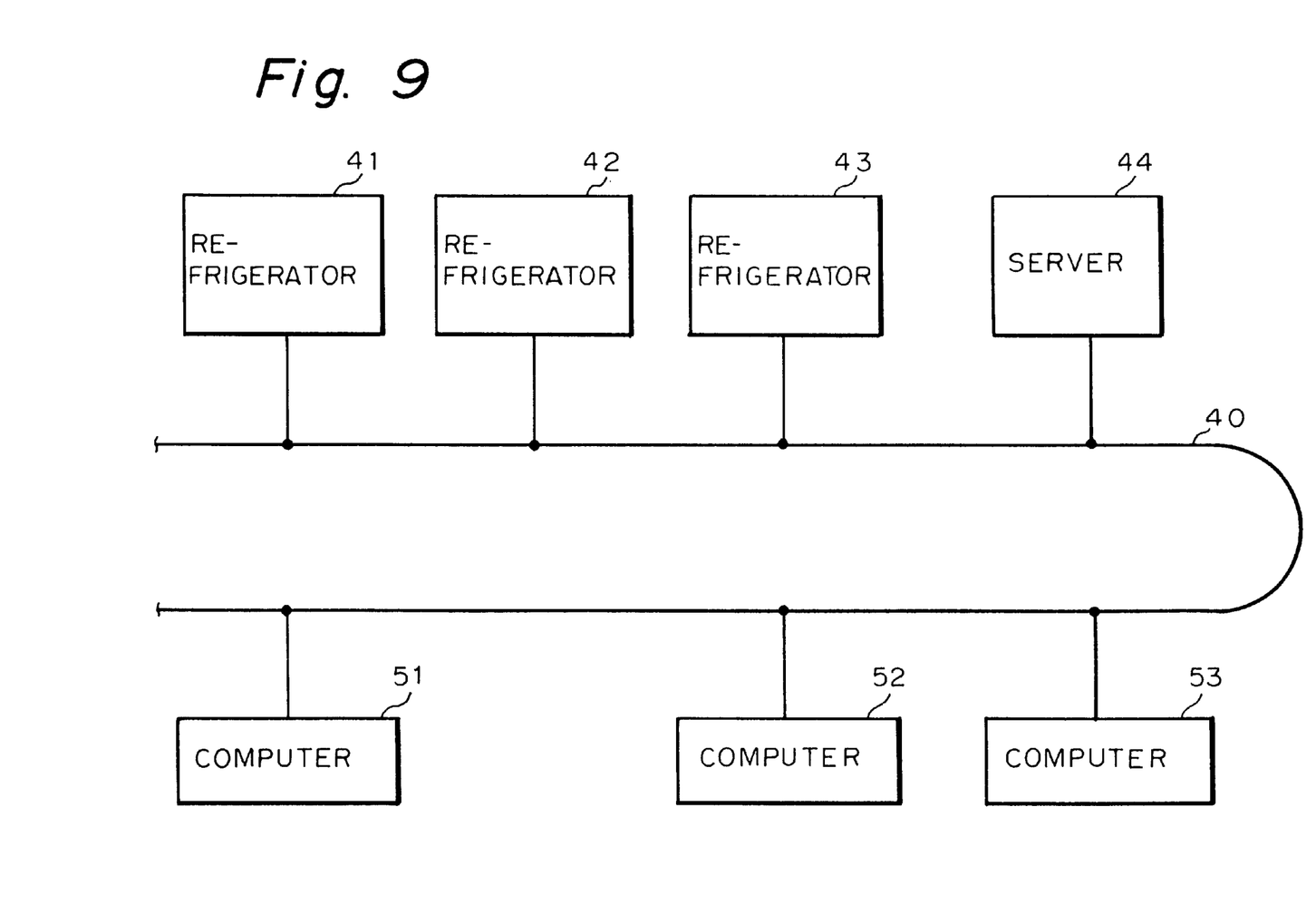
FIG. 9 is a block diagram illustrating a seventh embodiment of the present invention.

In a seventh embodiment, computers 51, 52, 53 respectively corresponding to the computers 45, 46, 47 in the sixth embodiment are connected to the network 40, as shown in FIG. 9. The computers 51., 52, 53 transmit and receive information such as control information and status information through the network 40.

In this way, it is possible to monitor and control the refrigerators 41, 42, 43 from an arbitrary location on the network 40.

Eighth Embodiment

Figure 10:
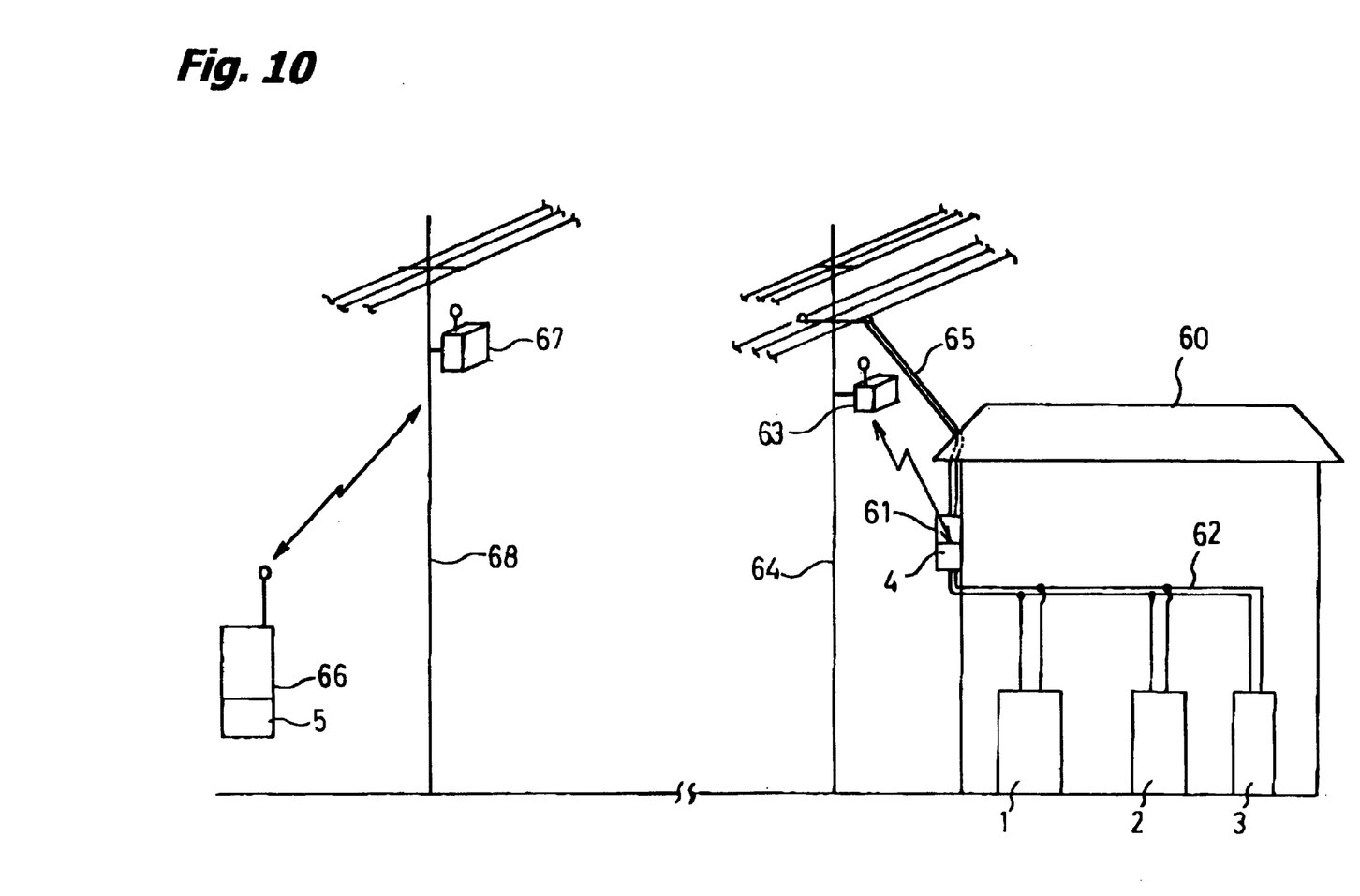
FIG. 10 is a schematic diagram illustrating an eighth embodiment of the present invention.

In the eighth embodiment, as shown in FIG. 10, the refrigerators 1, 2 and 3 are installed in a house 60. The virtual machine constructor 4 is installed in a watt-hour meter 61 fixed on the wall of the house 60. The virtual machine constructor 4 is connected with the refrigerators 1, 2 and 3 through a power line 62 wired in the house 60. The virtual machine constructor 4 includes a radiotelephone of Personal Handyphone System (PHS) that communicates with a relay station 63 installed on a telegraph pole 64 in the vicinity of the house 60. The watt-hour meter 61 is connected to a drop wire 65.

Reference numeral 66 denotes a radiotelephone of PHS including a controller 5 of the present apparatus management system therein. The input keys of the radiotelephone 66 are also used as the input unit of the controller 5. The display of the radiotelephone 66 is also used as the display unit of the controller 5. The radiotelephone 66 communicates with a relay station 67 installed on a telegraph pole 68.

In operation, the refrigerators 1, 2 and 3 send their machine information, status information and control information to the virtual machine constructor 4 through the power line 62 when they are initially connected to the power line 62 and thereafter periodically.

The virtual machine constructor 4 constructs virtual machines in response to the received machine information, status information and control information, and then holds them therein. The virtual machine constructor 4 updates the held virtual machines each time when it receives new machine information, new status information and new control information from the refrigerators 1, 2 and 3. The virtual machine constructor 4 further sends the held virtual machines to the controller 5 built in the radiotelephone 66 through the relay stations 63 and 67 by radio, i.e., PHS, periodically.

The controller 5 holds the sent virtual machines from the virtual machine constructor 4 therein. Further, the controller 5 selects one of the virtual machines held therein to display the selected virtual machine on the display of the radiotelephone 66 in response to an instruction inputted into the controller 5 by a user. Also, the controller 5 updates the virtual machines held therein each time that it receives any of the virtual machines from the virtual machine constructor 4.

When the user inputs control information for controlling any of the refrigerators 1, 2 and 3 while watching the display of the radiotelephone 66 and manipulates the input keys of the radiotelephone 66 for the purpose of controlling the refrigerator, then the control information of the virtual machine is updated in response to the inputted instruction by the user. Subsequently, the updated virtual machine, including the updated control information, is sent to the virtual machine controller 4 from the controller 5 by radio through the radiotelephone 66, relay stations 63 and radiotelephone 61.

When the virtual machine constructor 4 receives the updated virtual machine from the controller 5, the virtual machine constructor 4 updates a virtual machine held therein that corresponds to the received virtual machine. The updated virtual machine is sent to the refrigerator that is the object to be controlled from the virtual machine constructor 4 through the power line 62. And then, the refrigerator starts a new operation based on the new control information included in the received updated virtual machine.

Accordingly, the user who is far from the refrigerators 1 and 3 can control the distant refrigerator with the radiotelephone 66. The user can also know the current status of the refrigerators anytime.

Although the virtual machine constructor 4 is installed in the watt-hour meter 61 in the eighth embodiment, the virtual machine constructor 4 may be installed at any place including a place in the vicinity of the watt-hour meter 61.

In addition, although the virtual machine constructor 4 communicates with the refrigerators 1, 2 and 3 through the power line 62 in the present embodiment, the virtual machine constructor 4 may communicate with the refrigerators 1, 2 and 3 by radio.

Furthermore, although the virtual machine constructor 4 and the controller 5 communicate by radio in this embodiment, the controller 5 may be installed in a control panel in a substation of a power company supplying electric power to the house 60 and may communicate with the virtual machine constructor 4 through a power transmission line between the substation and the house 60. Thereby, the power company can control the operation of all of the apparatuses installed in each house to which the substation supplies electric power for preventing the waste of electric power, the occurrence of fire, and the like. Furthermore, the power company can turn on unpowered TV sets in each house to warn of the occurrence of disasters.

The controller 5, of course, may be provided at a plurality of places. That is, one of the controllers 5 may be installed in a control panel in a substation, and the other controller may be installed in a user's radiotelephone 66, for example.

The invention has been described in detail with particular reference to certain embodiments thereof, but it will be understood that variations and modifications can be effected within the spirit and scope of the invention.

The entire disclosure of Japanese Patent Application No 8-314334 filed on Nov. 26, 1996, including specification, claims, drawings and summary, is incorporated herein by reference in its entirety.

What is claimed is:

1. An apparatus management system for managing at least one apparatus having machine information indicative of its initial conditions, status information and/or control information, and outputting them when said apparatus is energized by a power supply subsequently and periodically, said system comprising:

a constructor connected to the apparatus and installed inside of a watt-hour meter for constructing and holding a virtual machine corresponding to the apparatus in response to the machine information, the status information and/or the control information received from the apparatus, said constructor being configured to update and output the virtual machine held therein in response to new information received from the apparatus; and a controller connected to said constructor and having a storing unit for holding the virtual machine received from the constructor and an input unit for receiving information for controlling the apparatus, said controller capable of updating the virtual machine held in said storing unit when information is inputted to said input unit, and of sending an updated virtual machine to said constructor, wherein said constructor is enabled to control the apparatus when the updated virtual machine is received from said controller.

2. The apparatus management system of claim 1, wherein said constructor, said controller, and the apparatus are connected to a communication network.

3. The apparatus management system of claim 1, wherein said controller further comprises a display unit for displaying a virtual machine in response to information inputted from said input unit, thereby enabling a user to input information for controlling the apparatus.

4. The apparatus management system of claim 1, wherein said apparatus and said constructor are connected to each other through a power line.

5. The apparatus management system of claim 1, wherein said constructor and said controller communicate by radio.

6. An apparatus management system for managing at least one apparatus having machine information indicative of its conditions, status information and/or control information, and outputting them when said apparatus is energized by a power supply subsequently and periodically, said system comprising:

a constructor provided to each apparatus and installed inside of a watt-hour meter for constructing and holding a virtual machine corresponding to the apparatus in response to the machine information, the status information and/or the control information received from the apparatus, said constructor being configured to update and output the virtual machine held therein in response to new information received from the apparatus; and a controller connected to said constructor and having a storing unit for holding the virtual machine received from the constructor and an input unit for receiving information for controlling the apparatus, said controller capable of updating the virtual machine held in said storing unit when information is inputted to said input unit, and of sending an updated virtual machine to said constructor, wherein said constructor is enabled to control the apparatus when the updated virtual machine is received from said controller.

7. The apparatus management system of claim 6, wherein said constructor, said controller, and the apparatus are connected to a communication network.

8. The apparatus management system of claim 6, wherein said controller further comprises a display unit for displaying a virtual machine in response to information inputted from said input unit, thereby enabling a user to input information for controlling the apparatus.

9. A system as set forth in claim 6, wherein said apparatus and said constructor are connected to each other through a power line.

10. A system as set forth in claim 6, wherein said constructor and said controller communicate by radio.

11. An apparatus management system for managing at least one apparatus having machine information indicative of its initial conditions, status information and/or control information, and outputting them when said apparatus is energized by a power supply subsequently and periodically, said system comprising:

a constructor connected to the apparatus and installed inside of a watt-hour meter for constructing and holding a virtual machine corresponding to the apparatus in response to the machine information, the status information and/or the control information received from the apparatus, said constructor being configured to update and output the virtual machine held therein in response to new information received from the apparatus;

a first controller connected to said constructor and having a storing unit for holding the virtual machine received from the constructor, said first controller capable of updating the virtual machine held in said storing unit in response to new information received from the constructor; and a second controller connected to said first controller and having a storing unit for storing control information for controlling the apparatus and having an input unit for receiving said control information, said second controller outputting said control information to said first controller, wherein said first controller is further capable of sending an updated virtual machine to said constructor in response to said control information received from said second controller, and wherein said construct or is enabled to control the apparatus in response to the updated virtual machine received from said first controller, thereby enabling automatic control of the apparatus.

12. The apparatus management system of claim 11, wherein said constructor, said first controller, and the apparatus are connected to a communication network.

13. The apparatus management system of claim 11, wherein said second controller further comprises a display unit for displaying a virtual machine in response to information inputted from said input unit, thereby enabling a user to input information for controlling the apparatus.

14. The apparatus management system of claim 11, wherein said apparatus and said constructor are connected to each other through a power line.

15. The apparatus management system of claim 11, wherein said constructor and said first and/or second controllers communicate by radio.

16. An apparatus management system for managing at least one apparatus having machine information indicative of its initial conditions, status information and/or control information, and outputting them when said apparatus is energized by a power supply subsequently and periodically, said system comprising:

a constructor connected to the apparatus and installed in the vicinity of a watt-hour meter for constructing and holding a virtual machine corresponding to the apparatus in response to the machine information, the status information and/or the control information received from the apparatus, said constructor being configured to update and output the virtual machine held therein in response to new information received from the apparatus; and a controller connected to said constructor and having a storing unit for holding the virtual machine received from the constructor and an input unit for receiving information for controlling the apparatus, said controller capable of updating the virtual machine held in said storing unit when information is inputted to said input unit, and of sending an updated virtual machine to said constructor, wherein said constructor is enabled to control the apparatus when the updated virtual machine is received from said controller.

17. The apparatus management system of claim 16, wherein said constructor, said controller, and the apparatus are connected to a communication network.

18. The apparatus management system of claim 16, wherein said controller further comprises a display unit for displaying a virtual machine in response to information inputted from said input unit, thereby enabling a user to input information for controlling the apparatus.

19. The apparatus management system of claim 16, wherein said apparatus and said constructor are connected to each other through a power line.

20. The apparatus management system of claim 16, wherein said constructor and said controller communicate by radio.

21. An apparatus management system for managing at least one apparatus having machine information indicative of its conditions, status information and/or control information, and outputting them when said apparatus is energized by a power supply subsequently and periodically, said system comprising:

a constructor provided to each apparatus and installed in the vicinity of a watt-hour meter for constructing and holding a virtual machine corresponding to the apparatus in response to the machine information, the status information and/or the control information received from the apparatus, said constructor being configured to update and output the virtual machine held therein in response to new information received from the apparatus; and a controller connected to said constructor and having a storing unit for holding the virtual machine received from the constructor and an input unit for receiving information for controlling the apparatus, said controller capable of updating the virtual machine held in said storing unit when information is inputted to said input unit, and of sending an updated virtual machine to said constructor, wherein said constructor is enabled to control the apparatus when the updated virtual machine is received from said controller.

22. The apparatus management system of claim 21, wherein said constructor, said controller, and the apparatus are connected to a communication network.

23. The apparatus management system of claim 21, wherein said controller further comprises a display unit for displaying a virtual machine in response to information inputted from said input unit, thereby enabling a user to input information for controlling the apparatus.

24. A system as set forth in claim 21, wherein said apparatus and said constructor are connected to each other through a power line.

25. A system as set forth in claim 21, wherein said constructor and said controller communicate by radio.

26. An apparatus management system for managing at least one apparatus having machine information indicative of its initial conditions, status information and/or control information, and outputting them when said apparatus is energized by a power supply subsequently and periodically, said system comprising:

a constructor connected to the apparatus and installed in the vicinity of a watt-hour meter for constructing and holding a virtual machine corresponding to the apparatus in response to the machine information, the status information and/or the control information received from the apparatus, said constructor being configured to update and output the virtual machine held therein in response to new information received from the apparatus;

a first controller connected to said constructor and having a storing unit for holding the virtual machine received from the constructor, said first controller capable of updating the virtual machine held in said storing unit in response to new information received from the constructor; and a second controller connected to said first controller and having a storing unit for storing control information for controlling the apparatus and having an input unit for receiving said control information, said second controller outputting said control information to said first controller, wherein said first controller is further capable of sending an updated virtual machine to said constructor in response to said control information received from said second controller, and wherein said constructor is enabled to control the apparatus in response to the updated virtual machine received from said first controller, thereby enabling automatic control of the apparatus.

27. The apparatus management system of claim 26, wherein said constructor, said first controller, and the apparatus are connected to a communication network.

28. The apparatus management system of claim 26, wherein said second controller further comprises a display unit for displaying a virtual machine in response to information inputted from said input unit, thereby enabling a user to input information for controlling the apparatus.

29. The apparatus management system of claim 26, wherein said apparatus and said constructor are connected to each other through a power line.

30. The apparatus management system of claim 26, wherein said constructor and said first and/or second controllers communicate by radio.

* * * * *